United States Patent
Nam et al.

(10) Patent No.: US 11,973,221 B2
(45) Date of Patent: Apr. 30, 2024

(54) CATHODE ACTIVE MATERIAL FOR LITHIUM SECONDARY BATTERY, PRODUCTION METHOD THEREFOR, AND LITHIUM SECONDARY BATTERY COMPRISING SAME

(71) Applicants: POSCO, Pohang-si (KR); Research Institute of Industrial Science & Techology, Pohang-si (KR)

(72) Inventors: Sang Cheol Nam, Seoul (KR); Sang Hyuk Lee, Incheon (KR); Junghoon Kim, Incheon (KR)

(73) Assignees: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

( * ) Notice: Subject to any disclaimer, the term of this patent is extended or adjusted under 35 U.S.C. 154(b) by 872 days.

(21) Appl. No.: 16/957,670

(22) PCT Filed: Dec. 12, 2018

(86) PCT No.: PCT/KR2018/015780
§ 371 (c)(1),
(2) Date: Aug. 4, 2020

(87) PCT Pub. No.: WO2019/132332
PCT Pub. Date: Jul. 4, 2019

(65) Prior Publication Data
US 2023/0140577 A1    May 4, 2023

(30) Foreign Application Priority Data
Dec. 26, 2017    (KR) .......................... 10-2017-0179895

(51) Int. Cl.
*H01M 4/505* (2010.01)
*H01M 4/525* (2010.01)

(52) U.S. Cl.
CPC .......... *H01M 4/505* (2013.01); *H01M 4/525* (2013.01)

(58) Field of Classification Search
None
See application file for complete search history.

(56) References Cited

U.S. PATENT DOCUMENTS

| | | |
|---|---|---|
| 2003/0211235 A1 | 11/2003 | Suh et al. |
| 2008/0233740 A1 | 9/2008 | Reinert |
| 2015/0357638 A1 | 12/2015 | Sun et al. |
| 2015/0380737 A1* | 12/2015 | Kawasato ............ H01M 4/505 |
| | | 252/521.2 |
| 2016/0181597 A1* | 6/2016 | Kim ...................... H01M 4/525 |
| | | 429/223 |
| 2016/0336595 A1 | 11/2016 | Choi et al. |
| 2017/0317344 A1* | 11/2017 | Tan ................... H01M 10/0525 |

FOREIGN PATENT DOCUMENTS

| | | | |
|---|---|---|---|
| CN | 102891307 A | 1/2013 | |
| CN | 104409700 A | 3/2015 | |
| CN | 105374992 A | 3/2016 | |
| CN | 107394160 A | 11/2017 | |
| CN | 108336331 A * | 7/2018 | ........... C01B 35/128 |
| CN | 108336331 A | 7/2018 | |
| EP | 3349276 A2 | 7/2018 | |
| JP | 2004-335278 A | 11/2004 | |
| JP | 2010-067499 A | 3/2010 | |
| JP | 2012-028313 A | 2/2012 | |
| JP | 2014-056683 A | 3/2014 | |
| JP | 2016-026981 A | 2/2016 | |
| JP | 2017-533568 A | 11/2017 | |
| JP | 2020-524385 A | 8/2020 | |
| KR | 10-2008-0112934 A | 12/2008 | |
| KR | 10-2014-0099218 A | 8/2014 | |
| KR | 10-2017-0063415 A | 6/2017 | |
| KR | 10-2017-0075596 A | 7/2017 | |
| KR | 10-1757628 B1 | 7/2017 | |
| KR | 10-2017-0090244 A | 8/2017 | |
| WO | 2017/069407 A1 | 4/2017 | |
| WO | 2017/150949 A1 | 9/2017 | |

OTHER PUBLICATIONS

Japanese Office Action dated Aug. 31, 2021 issued in Japanese Patent Application No. 2020-535161.
Y-K Sun, et al., "A novel concentration-gradient Li[Ni0.83Co0.07Mn0.10]O2 cathode material for high-energy lithium-ion batteries," Journal of Materials Chemistry, 2011, No. 21, pp. 10108-10112.
1 Japanese Notice of Allowance dated Dec. 14, 2021 issued in Japanese Patent Application No. 2020-535161.
International Search Report dated Mar. 26, 2019 issued in International Patent Application No. PCT/KR2018/015780 (with English translation).
Yang-Kook Sun, "A Novel Concentration-Gradient Li[Nio.83Co0.07Mn0.10]O2 Cathode Material For High-Energy Lithium-ion Batteries," Journal of Materials Chemistry, Feb. 9, 2011, pp. 10108-10112.
Chaoping Liang, et al. "Site-dependent multicomponent doping strategy for Ni-rich LiNi1-2yCoyMnyO2 (y=1/12) cathode materials for Li-ion batteries," Journal of Materials Chemistry A, 2017, Issue 5, pp. 25303-25313.

(Continued)

*Primary Examiner* — Tanisha Diggs
(74) *Attorney, Agent, or Firm* — Morgan, Lewis & Bockius LLP

(57) ABSTRACT

It is related to a positive active material for lithium secondary battery, a manufacturing method thereof, and a lithium secondary battery containing the same, provides that a positive active material for lithium secondary battery, wherein, it is a layered lithium metal compound comprises nickel, cobalt, and manganese, and aluminum, zirconium, and boron are doped.

16 Claims, 9 Drawing Sheets

(56) References Cited

OTHER PUBLICATIONS

Guorong Hu, et al. "Mg—Al—B co-substitution LiNi0.5Co0.2Mn0.3O2 cathode materials with improved cycling performance for lithium-ion battery under high cutoff voltage," Electrochimica Acta, Elsevier, 2016, No. 1.7, vol. 190 (pp. 264-275).
Extended European Search Report dated Mar. 12, 2021 issued in European Patent Application No. 18896294.8.
C. Li, et al., "Cathode materials modified by surface coating for lithium ion batteries," Electrochimica Acta, Elsevier, Amsterdam, NL, vol. 51., No. 19, May 20, 2006, p. 3872-3888.
Chinese Office Action dated Aug. 31, 2023 issued in Chinese Patent Application No. 2023083101345730.
Si Hyoung Oh, et al., "Structural and electrochemical investigations on the LiNi0.5-xMn1.5-yMx+yO4 (M=Cr, Al, Zr) compound for 5V cathode material," Journal of Alloys and Compounds, vol. 469, Issues 1-2, Feb. 5, 2009, pp. 244-250.
European Office Action dated Sep. 15, 2023 issued in European Patent Application No. 18896294.8.
Chinese Notice of Allowance dated Jan. 9, 2024 issued in Chinese Patent Application No. 201880090290.X (with English translation).

\* cited by examiner

[FIG. 1]
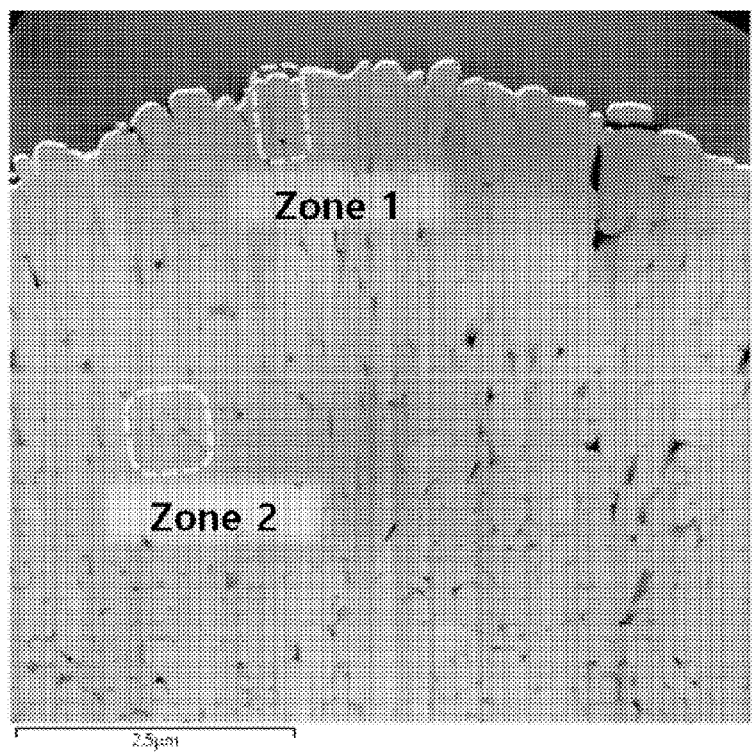

[FIG. 2]
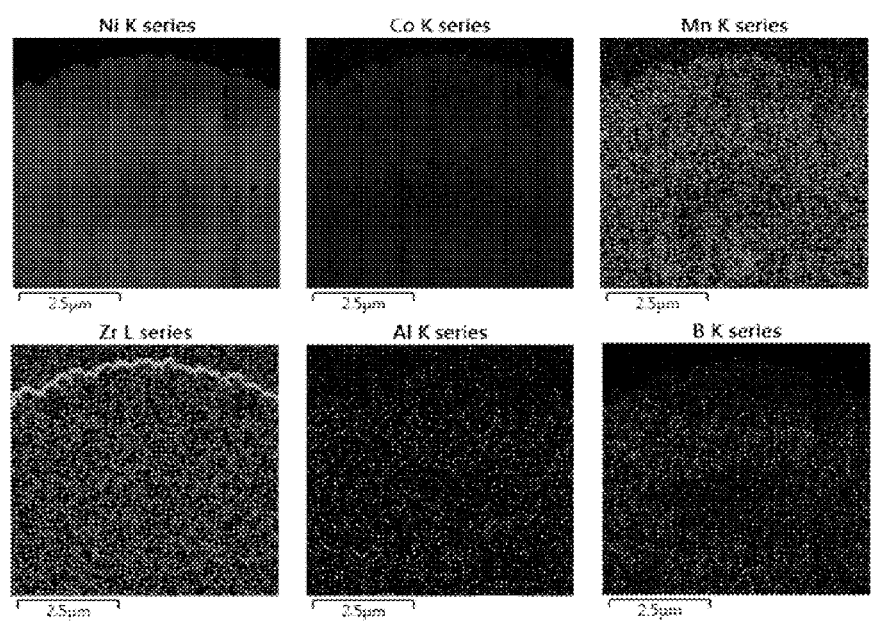

[FIG. 3]
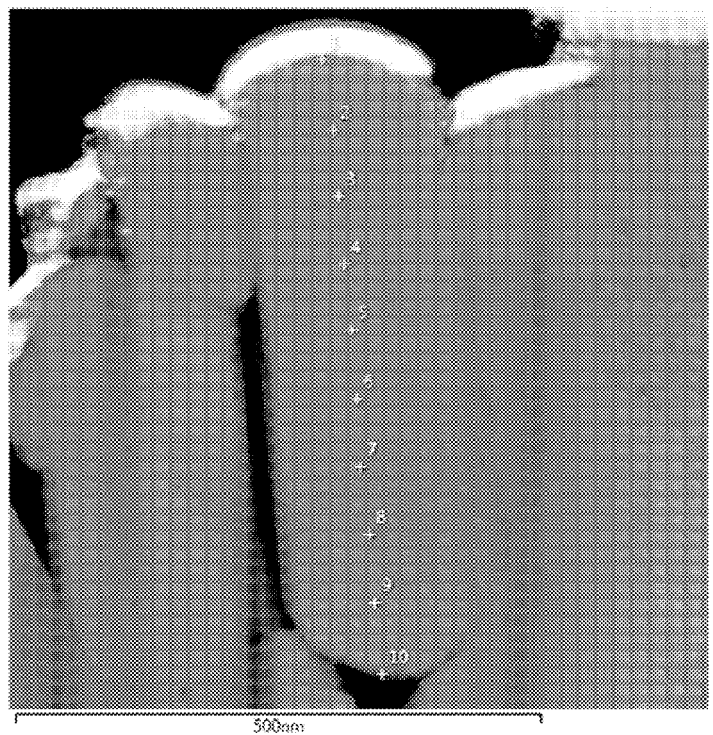

[FIG. 4]
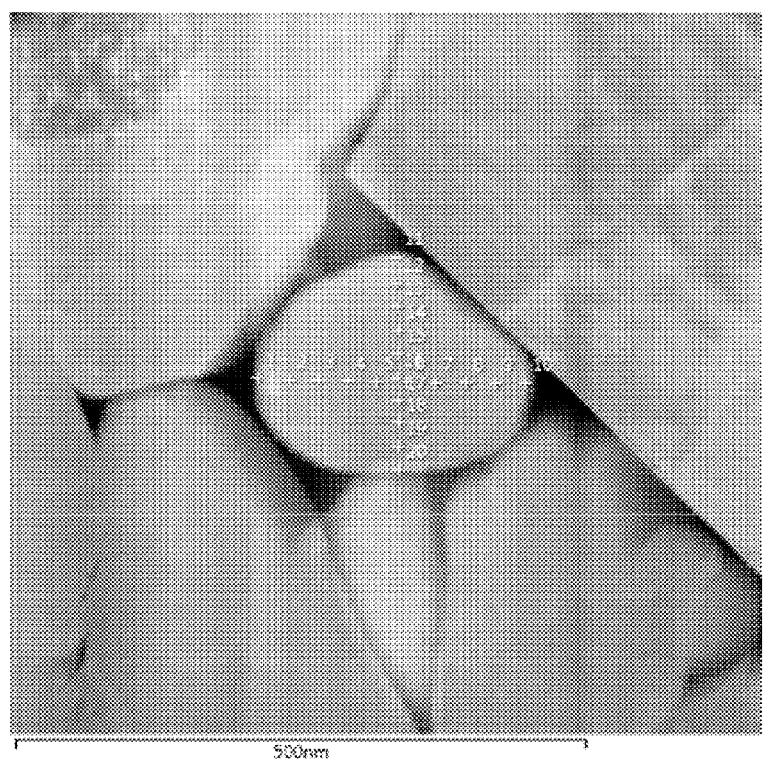

[FIG. 5]
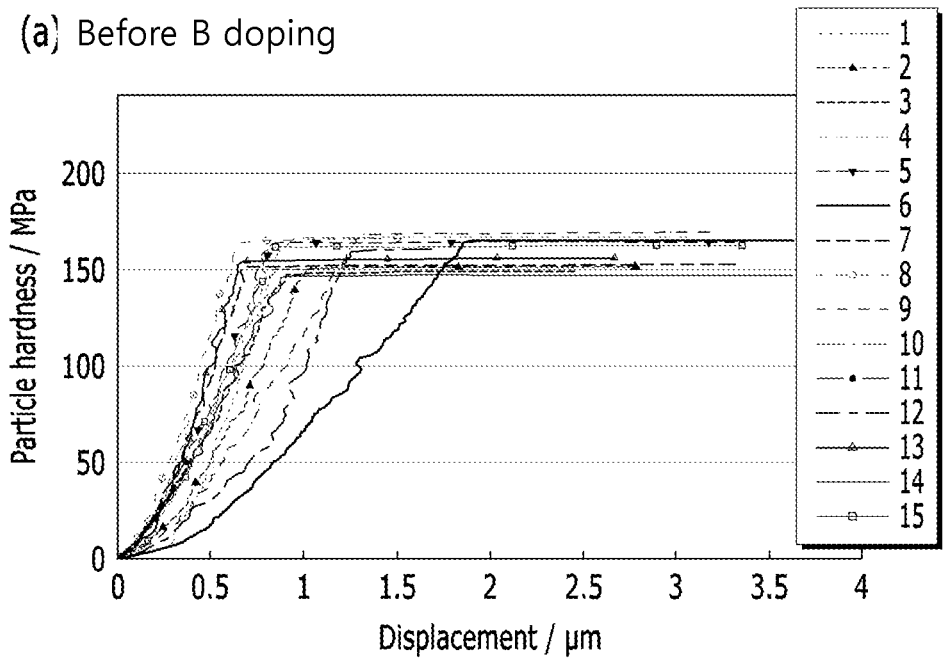
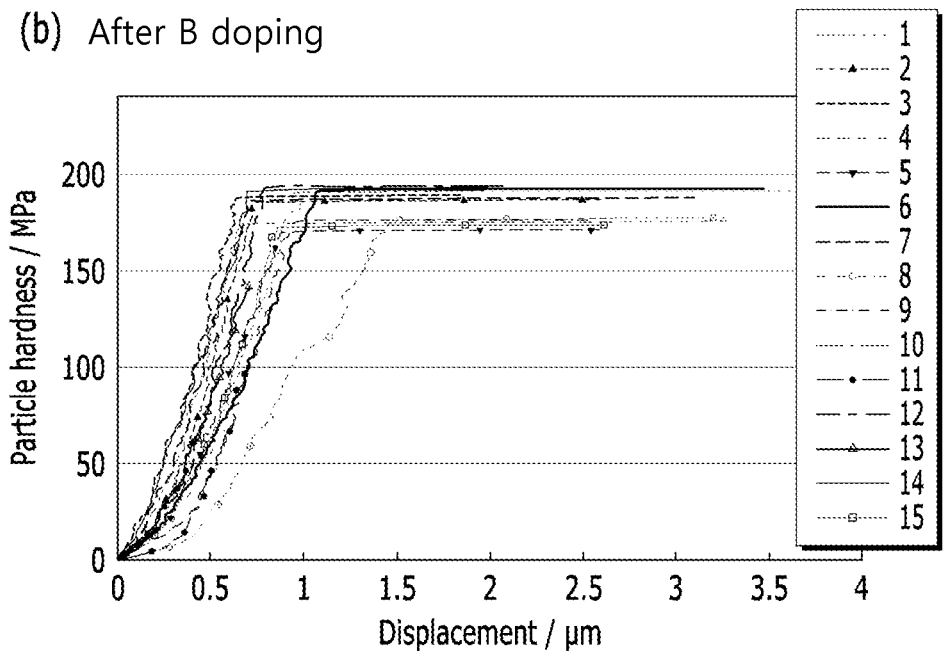

[FIG. 6]
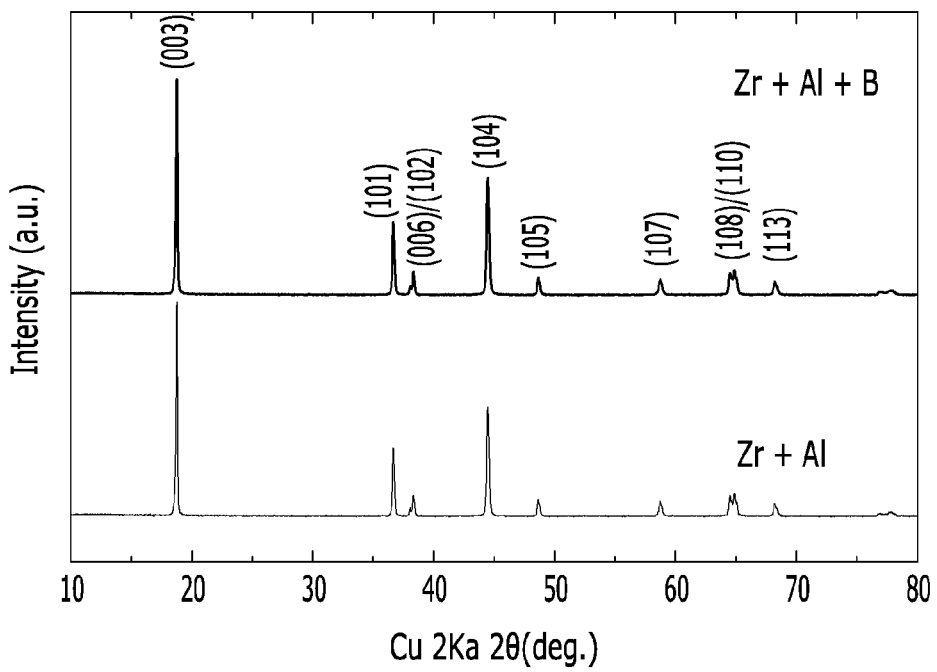

[FIG. 7]
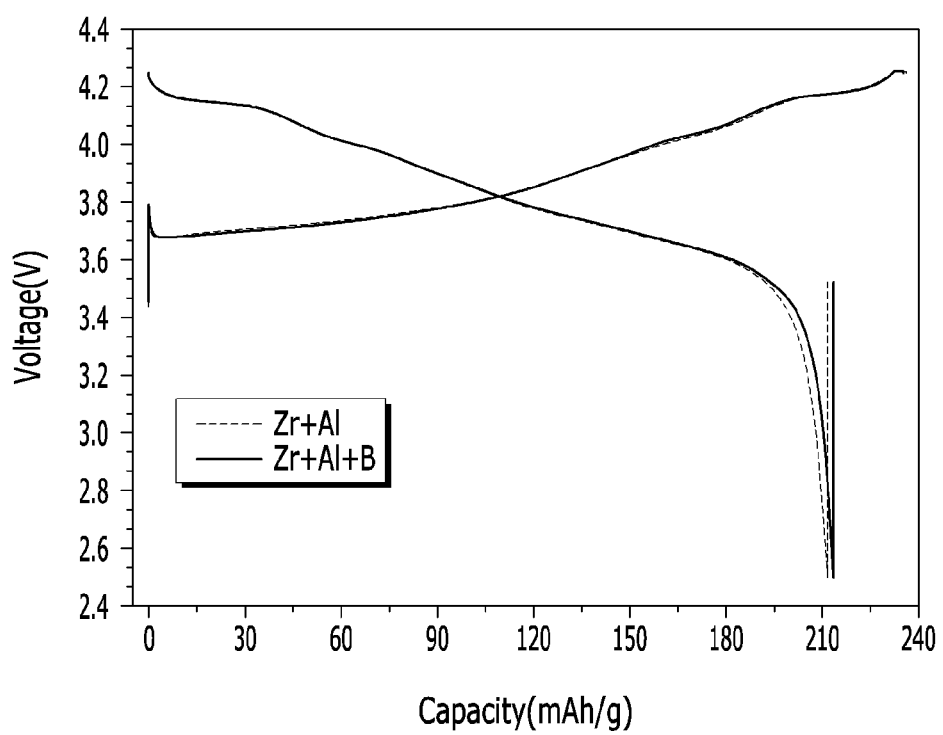

【FIG. 8】
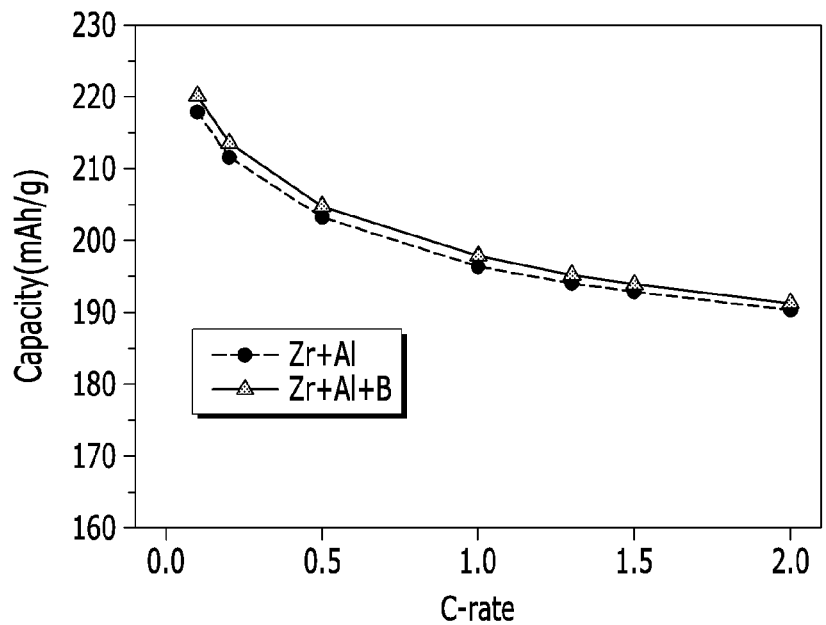
【FIG. 9】
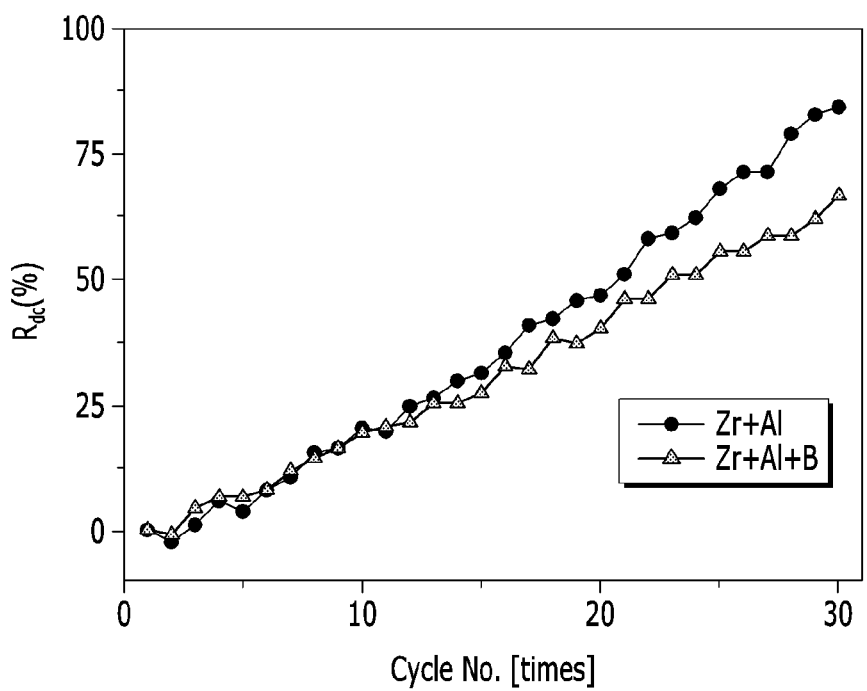

[FIG. 10]
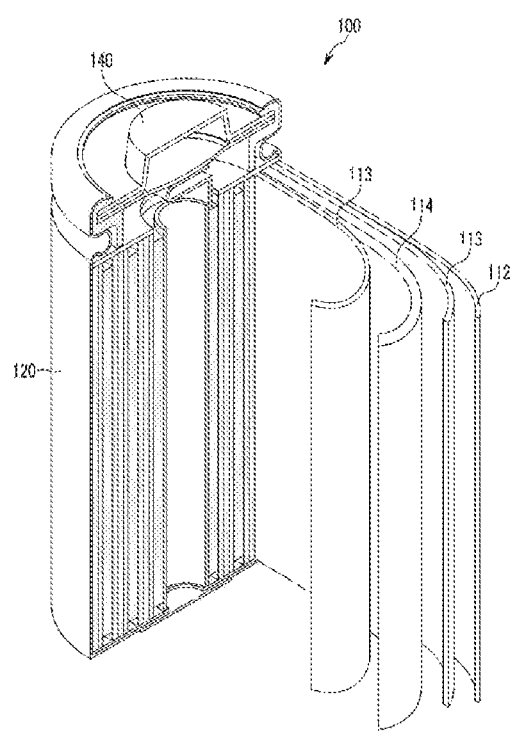

CATHODE ACTIVE MATERIAL FOR LITHIUM SECONDARY BATTERY, PRODUCTION METHOD THEREFOR, AND LITHIUM SECONDARY BATTERY COMPRISING SAME

CROSS-REFERENCE OF RELATED APPLICATIONS

This application is the U.S. National Phase under 35 U.S.C. § 371 of International Patent Application No. PCT/KR2018/015780, filed on Dec. 12, 2018, which in turn claims the benefit of Korean Application No. 10-2017-0179895, filed on Dec. 26, 2017, the entire disclosures of which applications are incorporated by reference herein.

TECHNICAL FIELD

It is related to a positive active material for a lithium secondary battery, a manufacturing method thereof, and a lithium secondary battery including the same.

BACKGROUND

Recently, there has been an explosive increase in demand for IT mobile devices and small power drives (e-bikes, small EVs, etc.). In addition, due to the demand for electric vehicles with a driving distance of over 400 km, development of a rechargeable battery having a high-capacity and a high energy density to drive it has been actively conducted worldwide. In order to manufacture such a high-capacity battery, a high-capacity positive material must be used.

Among the existing layered positive active materials, the highest capacity is $LiNiO_2$ (275 mAh/g). However, when charging and discharging, structural collapse easily occurs and due to the problem of oxidation number, thermal stability is low, so commercially available is difficult.

To solve this problem, other stable transition metals (Co, Mn, etc.) must be substituted for the unstable Ni site, and for this, a ternary NCM system in which Co and Mn are substituted has been developed.

In the case of a ternary NCM system, when the Ni content is increased, it becomes structurally unstable. Therefore, the applications of doping material and surface coating that can stabilize it are important technologies. However, it is true that uniform doping and coating are not easy with High Ni positive materials.

As one of the methods that can solve this, the Ni concentration of the positive material core portion is kept high, making it high-capacity, reducing the Ni concentration of the shell portion, and increasing the content of Co and Mn to increase the structure stability. The method for preparing a stabilized concentration gradient type positive active material has been proposed.

The primary particles of the shell portion undergo cell charging and discharging processes after cell production, and the possibility of cracks in the surface portion is increased. The reason is that the volume of the shell portion is increased radially when charged. Eventually, the stress of volume change is increased as lithium undergoes intercalation/de-intercalation.

DISCLOSURE

Problem to Solve

The present invention can provide a positive active material with reduced cracking of the shell after charging and discharging in the above-described core-shell structured positive material. When applying the positive active material according to the present invention, a lithium secondary battery with improved performance can be manufactured.

Solution to Problem

In one embodiment of the present invention, it provides that a positive active material for lithium secondary battery, wherein, it is a layered lithium metal compound comprises nickel, cobalt, and manganese, and aluminum, zirconium, and boron are doped.

The lithium metal compound is represented by Chemical Formula 1 below:

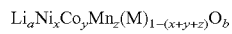

[Chemical Formula 1]

In the Chemical Formula 1, it is 0.8≤a≤1.3, 1.8≤b≤2.2, 0.8≤x≤0.92, 0<y≤0.15, 0<z≤0.1, and 0<x+y+z<1; and the doping element M comprises Al, Zr, and B.

More specifically, the doping elements Al, Zr, and B may be simultaneously included. Due to this, it is possible to achieve an effect of improving the particle strength of the active material.

The positive active material comprises a core portion and a shell portion of the core portion surface, the core portion and the shell portion is made of a composition containing Ni, Co, Mn, and M elements in the Chemical Formula 1.

As described above, this is a method for achieving structural stability.

More specifically, the core portion is 70 to 80% for 100% of the entire positive active material diameter.

The content of nickel in the core portion may be higher than the content of nickel in the shell portion, and the content distribution of nickel in the core portion may be uniform. In addition, the distribution of nickel content in the shell portion may have a concentration gradient that decreases as it approaches the active material surface.

With respect to 1 mole of the entire metal containing Ni, Co, Mn, and M,
  a doping ratio of Al among the doping elements M is 0.0002 to 0.01 mole. Due to this range of doping, the effect of reducing the resistance and improving the output characteristic of the battery can be expected.

With respect to 1 mole of the entire metal containing Ni, Co, Mn, and M, a doping ratio of Zr among the doping elements M is 0.0015 to 0.005 mol. The thermal safety improvement effect can be expected due to the doping in this range.

With respect to 1 mole of the entire metal containing Ni, Co, Mn, and M, a doping ratio of B among the doping elements M is 0.001 to 0.01 mol. Due to this range of doping, it is expected to improve the particle strength of the active material.

The positive active material has a crystal size (Crystalline size) of 90 nm or more. More specifically, it may be 92 nm or more, 95 nm or more, or 98 nm or more. The crystal size may be 130 nm or less. The crystal size of this range can be expected to improve the output; and charge and discharge cycle.

The positive active material has an I003/I104 value of 1.2 or higher. More specifically, it may be 1.22 or more. It may also be 1.4 or less. This range can have a positive effect on increasing the charge and discharge capacity by suppressing the cation mixing effect.

A R factor of the positive active material is 0.52 or less. More specifically, it may be 0.514 or less. Such a range can achieve the effect that the layered positive material structure is well formed.

The positive active material further comprises a coating layer positioned on the surface of the shell portion.

The coating layer comprises boron, boron oxide, lithium boron oxide or combination thereof. However, this is only an example, and various coating materials used for positive active materials may be used.

The positive active material is a bimodal mixed with large particle and small particle.

A D50 of the large particle is 13 to 17 μm, and a D50 of the small particle is 4 to 7 μm.

In addition, the mixing ratio of the large particle and the small particle may be 50 to 80 wt % of the large particle based on the entire 100 wt %. The energy density can be improved due to the bimodal particle distribution.

In another embodiment of the present invention, it provides that a method of manufacturing a positive active material for lithium secondary battery, comprising: preparing precursor particles comprising nickel, cobalt, and manganese; obtaining lithium metal oxide by mixing and sintering the precursor particles, lithium raw material, and doping raw material; forming a coating layer by mixing and heating a coating raw material on the lithium metal oxide;

wherein, the doped raw material comprises Al raw material, Zr raw material, and B raw material.

In the step of obtaining lithium metal oxide by mixing and sintering the precursor particles, lithium raw material, and doping raw material, a sintering condition is continues to primary and secondary temperatures while inflowing oxygen, and the primary temperature is 450 to 550° C., and the secondary temperature is 700 to 750° C.

The sintering condition can be controlled so that the doping element can be sufficiently introduced into the precursor particle. In addition, it may be partially adjusted depending on the content and combination of doping elements.

More specifically, $H_3BO_3$ may be used as a raw material for boron doping, and the material may be uniformly diffused into the positive material by melting at a temperature rising region during the sintering process.

In addition, in the step of preparing the precursor particles, the precursor particles may have a bimodal particle distribution of the aforementioned type.

Each bimodal precursor particle may have an element distribution in the above-described core-shell structure particle.

Description of this will be omitted because it is the same as described above.

In another embodiment of the present invention, it provides that a lithium secondary battery, comprising: a positive electrode; a negative electrode; and an electrolyte is positioned between the positive and the negative electrode, the positive electrode comprises a positive active material according to an embodiment of the present invention described above.

Hereinafter, a lithium secondary battery according to an exemplary embodiment is described with reference to FIG. 10.

FIG. 10 schematically shows a lithium secondary battery according to an exemplary embodiment of the present description.

Referring to FIG. 10, the lithium secondary battery 100 is cylindrical, and composed of negative electrode 112; positive electrode 114; separator 113 disposed between negative electrode 112 and positive electrode 114; the negative electrode 112, positive electrode 114 and separator 113 impregnation electrolyte (not shown); battery container 120; a sealing member 140 for sealing the battery container 120; as a main part.

The lithium secondary battery 100 is configured by sequentially stacking the negative electrode 112, the positive electrode 114, and the separator 113, and then storing them in a battery container 120 in a spiral-wound shape on a spiral.

In the present disclosure, a positive electrode including a positive active material for a lithium secondary battery according to the present disclosure described above may be used as the positive electrode.

The positive electrode includes the current collector and the positive electrode active material layer formed on the current collector. The positive active material layer includes a positive active material, and the positive active material may include a positive active material for a lithium secondary battery according to the exemplary embodiment described above.

In the positive active material layer, the content of the positive active material layer may be 90 wt % to 98 wt % based on the entire weight of the positive active material layer.

In one embodiment, the positive active material layer may further include a binder and a conductive material. At this time, the content of the binder and conductive material may be 1 wt % to 5 wt %, respectively, relative to the entire weight of the positive active material layer.

The binder plays a role of adhering positive active material particles well to each other, and also adhering positive active material to the current collector. For typical example, there may be polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like, but is not limited thereto.

The conductive material is used to give conductivity to the electrode, and any material can be the conductive material as long as the material is an electronic conductive material and it does not trigger a chemical change in the battery configured according to the method. For example, a conductive material may include metal powders such as natural graphite, artificial graphite, carbon black, acetylene black, ketjen black, carbon fiber, copper, nickel, aluminum, silver, or the like; metal fibers; and the like. Moreover, a mixture of one or more conductive materials such as polyphenylene derivatives or the like may be used.

As the current collector, aluminum foil, nickel foil or combination thereof can be used, but is not limited.

The negative electrode includes a current collector and a negative electrode active material layer formed on the current collector, and the negative electrode active material layer includes a negative electrode active material. The negative electrode may also include a structure-retaining layer according to an exemplary embodiment of the present disclosure.

The negative electrode active material includes materials capable of reversibly intercalating and deintercalating lithium ions, a lithium metal, lithium metal alloys, materials being capable of doping and dedoping lithium, and transition metal oxides.

A carbon material is one of the materials capable of reversibly intercalating and deintercalating lithium ions. Everything can be used as a carbon-based negative electrode active material normally used in the lithium ion battery. For typical example, one or both of crystalline carbon and amorphous carbon can be used. Example of the crystalline carbon is amorphous, plate, flake, spherical, or fiber shaped natural graphite or artificial graphite. Example of the amorphous carbon is soft carbon (low temperature fired carbon), hard carbon, mesophase pitch carbide, fired coke, or the like.

The alloys prepared by mixing lithium and a metal selected from the group consisting of Na, K, Rb, Cs, Fr, Be, Mg, Ca, Sr, Si, Sb, Pb, In, Zn, Ba, Ra, Ge, Al, and Sn can be used for the lithium metal alloys.

The materials being capable of doping and dedoping lithium are Si, $SiO_x$(0<x<2), Si-Q alloys (wherein Q is an element selected from the group consisting of alkali metals, alkaline earth metals, group 13 elements, group 14 elements, transition metals, rare earth elements, or combinations thereof, except for Si), Sn, $SnO_2$, Sn—R (wherein R is an element selected from the group consisting of alkali metals, alkaline earth metals, group 13 elements, group 14 elements, transition metals, rare earth elements, or combinations thereof, except for Sn), and the like. Moreover, a mixture between at least one of them and $SiO_2$ also can be used as the materials being capable of doping and dedoping lithium. The Q element or the R element is selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

As the transition metal oxide, lithium titanium oxide can be used.

The negative active material layer content of the negative active material layer may be 95 wt % to 99 wt % relative to the entire weight of the negative active material layer.

The negative active material layer includes a negative active material and a binder, and may optionally further include a conductive material.

The negative active material layer content of the negative active material layer may be 95 wt % to 99 wt % relative to the entire weight of the negative active material layer. The content of the binder in the negative active material layer may be 1 wt % to 5 wt % relative to the entire weight of the negative active material layer. In addition, when the conductive material is further included, 90 wt % to 98 wt % of the negative active material, 1 to 5 wt % of the binder, and 1 wt % to 5 wt % of the conductive material may be used.

The binder plays a role of adhering negative active material particles well to each other and also adhering negative active material to the current collector. The binder may be a water-insoluble binder, a water-soluble binder, or a combination thereof.

The water-insoluble binder may be polyvinylchloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, polyamide-imide, polyimide, or combinations thereof.

The water-soluble binder may be styrene-butadiene rubber, acrylated styrene-butadiene rubber, polyvinylalcohol, sodium polyacrylate, propylene, and olefin copolymers containing 2 to 8 carbon atoms, (meth) acrylic acid, (meth) acrylic acid alkyl ester copolymers or combinations thereof.

When the water-soluble binder is used as the negative electrode binder, the water-soluble binder may further include a cellulose-based compound which can impart the viscosity. Mixtures prepared by mixing one or more kinds of carboxymethyl cellulose, hydroxypropylmethyl cellulose, methyl cellulose, alkali metal salts thereof, and the like may be used as the cellulose-based compound. The alkali metal includes Na, K, or Li. Such the thickening agent content may be 0.1 to 3 parts by weight based on 100 parts by weight of the binder.

The conductive material is used to give conductivity to the electrode, and any material can be the conductive material as long as the material is an electronic conductive material and it does not trigger a chemical change in the battery configured according to the method. For example, the conductive material may include carbon-based materials such as natural graphite, artificial graphite, carbon black, acetylene black, ketjen black, carbon fiber, and the like; metal-based materials containing metal powders such as copper, nickel, aluminum, silver, and the like, metal fibers, and the like; conductive polymers such as polyphenylene derivatives; and a mixture thereof.

The current collector include a copper foil, a nickel foil, a stainless steel foil, a titanium foil, a nickel foam, a copper foam, a polymer substrate coated with conductive metals, and groups consisting of combinations thereof.

In addition, the positive electrode, negative electrode and separator may be impregnation in the electrolyte solution.

The separator separates the positive electrode and the negative electrode and provides a passage for lithium ions. Any separator that is commonly used in lithium secondary batteries can be used.

The separator may be selected from, for example, glass fiber, polyester, polyethylene, polypropylene, polytetrafluoroethylene or combination thereof, and may be in the form of a non-woven fabric or woven fabric. For example, a lithium secondary battery may be mainly used as a polyolefin-based polymer separator such as polyethylene or polypropylene; a separator coated with a composition containing a ceramic component or a polymer material may be used to secure heat resistance or mechanical strength; and it can be used as a single layer or multi-layered structure optionally.

The electrolyte solution contains a non-aqueous organic solvent and a lithium salt.

The non-aqueous organic solvent serves as a medium for transporting ions taking part in the electrochemical reaction of a battery.

The non-aqueous organic solvent may be a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC). and the like and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran and the like, and the ketone-based solvent may be cyclohexanone, and the like. The alcohol-based solvent may include ethanol, isopropyl alcohol, and the like, and the aprotic solvent may include nitriles such as R—CN (wherein R is a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable battery performance.

In addition, in the case of a carbonate-based solvent, it is desirable to use a mixture of cyclic carbonate and chain carbonate. Herein, the mixture of the cyclic carbonate and the chain carbonate in a volume ratio of 1:1 to 1:9 may be used to exhibit excellent electrolyte performance.

The non-aqueous organic solvent of the present disclosure may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

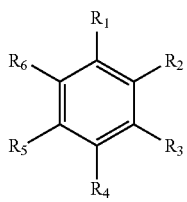

[Chemical Formula 2]

In Chemical Formula 2, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of Chemical Formula 3 in order to improve battery cycle-life.

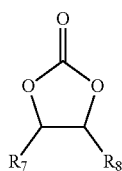

[Chemical Formula 3]

In Chemical Formula 3, $R_7$ and $R_8$ are the same or different, and selected from hydrogen, a halogen, a cyano group (CN), a nitro group ($NO_2$), a fluorinated C1 to C5 alkyl group, provided that at least one of $R_7$ and $R_8$ is selected from a halogen, a cyano group (CN), a nitro group ($NO_2$), and a fluorinated C1 to C5 alkyl group and both $R_7$ and $R_8$ are not hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. When the additive for improving the cycle-life is further used, its use amount may be adjusted appropriately.

The lithium salt dissolved in the organic solvent may act as a source of lithium ion in the battery, enabling a basic operation of a lithium secondary battery and promoting the movement of lithium ions between the positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, LiCl, LiI, and $LiB(C_2O_4)_2$ (lithium bis(oxalato) borate; LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Meanwhile, the separator disposed between the positive electrode and the negative electrode may be a polymer film. Examples of a suitable separator material include polyethylene, polypropylene, polyvinylidene fluoride, and multilayers thereof such as a polyethylene/polypropylene double-layered separator, a polyethylene/polypropylene/polyethylene triple-layered separator, and a polypropylene/polyethylene/polypropylene triple-layered separator.

Effect

The present invention can provide a positive active material with reduced shell portion crack generation after charging and discharging in the above-described core-shell structured positive material. When applying the positive active material according to the present invention, a lithium secondary battery with improved performance can be manufactured.

More specifically, through the present invention, it is possible to improve the particle strength in the Ni-based positive electrode material. So that it is possible to greatly improve the high temperature cycle and high temperature DCIR characteristic.

BRIEF DESCRIPTION OF DRAWINGS

FIG. 1 is a FIB cross-section SEM image measurement result of a cathode material prepared according to an exemplary embodiment.

FIG. 2 is a positive electrode material mapping result prepared according to an exemplary embodiment.

FIG. 3 is a SEM photograph showing the zone 1 in FIG. 1, and point of EDS measurement position.

FIG. 4 is a SEM image showing the zone 2 in FIG. 1, and point of EDS measurement position.

FIG. 5 is the particle strength measurement before and after boron doping.

FIG. 6 is an XRD measurement result before and after boron doping.

FIG. 7 is the result of the initial charge and discharge analysis before and after boron doping.

FIG. 8 is a result of analyzing the discharge capacity of each C-rate before and after boron doping.

FIG. 9 is a high temperature DCIR increase rate (45° C., SOC 100%) analysis result before and after boron doping.

FIG. 10 is a schematic diagram of a lithium secondary battery according to an embodiment of the present invention.

DESCRIPTION

Hereinafter, various embodiments of the present invention will be described in detail with reference to the accompanying drawings so that those skilled in the art to which the present invention belongs can easily practice. The present invention can be implemented in many different forms and is not limited to the implementations described herein.

In order to clearly describe the present invention, parts not related to the description are omitted, and the same reference numerals are assigned to the same or similar constituent elements throughout the specification.

In addition, since the size and thickness of each component shown in the drawing are arbitrarily shown for convenience of explanation, the present invention is not necessarily limited to what is shown. In the drawings, the thickness of layers, films, panels, regions, etc., are exaggerated for clarity. And in the drawing, for convenience of explanation, the thickness of some layers and regions is exaggerated.

In addition, It will be understood that when an element such as a layer, film, region, or substrate is referred to as being "on" another element, it can be directly on the other element or intervening elements may also be present. In contrast, when an element is referred to as being "directly on" another element, there are no intervening elements present. Also, being "above" or "top" of a reference part is to position above or below the reference part, and does not necessarily mean to be "above" or "top" toward the opposite direction of gravity.

In addition, In addition, unless explicitly described to the contrary, the word "comprise", and variations such as "comprises" or "comprising", will be understood to imply the inclusion of stated elements but not the exclusion of any other elements.

Exemplary Embodiment 1

Preparation of Ni 88 Mol % Precursor

Prior to the preparation of the positive active material, the precursor having the composition $(Ni_{0.88}Co_{0.095}Mn_{0.025}, OH)_2$ was prepared by a general co-precipitation method.

The raw material supply solution was designed with $(Ni_{0.98}Co_{0.01}Mn_{0.01}, OH)_2$ as the core portion composition and $(Ni_{0.64}Co_{0.23}Mn_{0.13}, OH)_2$ as the shell portion composition. The core portion kept the Ni concentration constant to form a core-shell gradient (CSG). In order to change the Ni concentration in the shell portion, Feeding tank 1 with high Ni concentration and Feeding tank 2 with low Ni concentration were arranged in series.

During the preparation of the precursor, the core portion was maintained for more than 10 hours of co-precipitation to increase the constant concentration of Ni, and to make the slope of the shell gradient region where the concentration of Ni changes steep. The thus prepared $(Ni_{0.88}Co_{0.095}Mn_{0.025}, OH)_2$ large particle precursor was grown to have an average particle size diameter of 14.8 μm. At this time, the diameter of the core portion was 11.1 μm, and the core portion diameter was maintained at 75% of the entire precursor diameter. The small particle precursor was also prepared in the same manner as described above. The precursor composition was also the same, and the average particle size diameter D50 was 5-6 μm. Based on the average particle size, the core part diameter was maintained at about 75% of the total diameter to make it 3.8-4.5 μm.

The precursor solution was commonly prepared by dissolving $NiSO_4 \cdot 6H_2O$, $CoSO_4 \cdot 7H_2O$, $MnSO_4 \cdot H_2O$ in DI water. $NH_4(OH)$ was added as a co-precipitation chelating agent, and NaOH was used to adjust the pH.

$N_2$ was purged to prevent oxidation of Ni during co-precipitation, and the reactor temperature was maintained at 50° C. The prepared precursor was filtered, washed with DI water, and dried in an oven at 100° C. for 24 h.

Zr, Al, and B Co-Doping CSG Ni 88% Positive Active Material Manufacturing

A large-diameter and small-diameter precursor having a core-shell gradient $(Ni_{0.88}Co_{0.095}Mn_{0.025}, OH)_2$ composition, and $LiOH \cdot H_2O$ (Samjeon Chemical, battery grade) were mixed in a 1:1.05 molar ratio.

$ZrO_2$ (Aldrich, 4N) was mixed in the mixture so that Zr 3,400 ppm compared to positive active material weight. Al was mixed with $Al(OH)_3$ (Aldrich, 4N) to be 140 ppm. $H_3BO_3$ (Aldrich, 4N) was uniformly mixed so that B was 540 ppm. Subsequently, it was charged in a tube furnace (interior diameter 50 mm, length 1,000 mm) and sintered while inflowing oxygen at 200 mL/min.

The sintering condition was maintained at 480° C. for 5 h, and then at 700-750° C. for 16 h, and the heating rate was 5° C./min.

The calcined large-diameter and small-diameter positive active materials were uniformly mixed in a weight ratio of 80:20 (large-diameter:small-diameter) to prepare a bi-modal form. The bimodal positive active material was washed with water to remove residual lithium. After $H_3BO_3$ was dry mixed and heat treated at a temperature of 200° C. or higher, B was uniformly coated on the surface.

Comparative Example

Zr, and Al Co-Doping CSG Ni 88% Positive Active Material Manufacturing

For comparison, a Ni88 positive active material was prepared in which only Zr and Al were co-doped without doping B. The manufacturing method is the same as the exemplary embodiment, where both large and small diameters were applied.

Experimental Example

Electrochemical Characteristic Evaluation Method

Electrochemical evaluation was performed using a CR2032 coin cell. The slurry for electrode plate production was positive electrode:conductive material (denka black): binder (PVDF, KF1100)=92.5:3.5:4 wt %, and NMP (N-Methyl-2-pyrrolidone) was added so that the solid content was about 30% for adjusting the viscosity.

The prepared slurry was coated on a 15 μm-thick Al foil using a Doctor blade, and then dried and rolled. The electrode loading amount was 14.6 mg/cm², and the rolling density was 3.1 g/cm³.

As the electrolyte solution, 1.5M VC was added to 1M $LiPF_6$ in EC:DMC:EMC=3:4:3 (vol %). Coin cell was manufactured using PP separator and lithium negative electrode (200 μm, Honzo metal). Thereafter, aging was performed at room temperature for 10 hours, and a charge and discharge test was performed.

For capacity evaluation, 215 mAh/g was used as the reference capacity, and CC/CV 2.5-4.25V, ½₀C cut-off was applied for charging and discharge conditions.

The initial capacity was 0.1C charging/0.1C discharge followed by 0.2C charging/0.2C discharge.

The output characteristic was 0.1C/0.2C/0.5C/1C/1.3C/1.5C/2C, and the discharge capacity was measured while increasing the C-rate. The high temperature cycle characteristic was measured 30 times at 0.3C charge/0.3C discharge condition at high temperature of 45° C.

The high temperature DC-iR was calculated by measuring the voltage after 60 seconds after applying discharge current at 100% charging of 4.25V as the charging and discharging cycle proceeds at 45° C.

FIG. 1 is a SEM image result of measuring a cross-section after FIB (Focused Ion Beam) milling of the central portion of the positive active material spherical particles prepared in exemplary embodiment 2. It can be seen that approximately 75% of the core portion of the average particle diameter of 14.8 μm represents bulk-type primary particles, and approximately 25% of the shell portion has rod-shaped primary particles having a large aspect ratio. It can be confirmed that the positive active material is synthesized close to the precursor design value in the exemplary embodiment.

The FIB cross-section SEM image of FIG. 1 can map elements by each added material in positive active materials and the result of this is shown in FIG. 2.

As in the element mapping of FIG. 2, it can be seen that the main elements Ni, Co, and Mn are uniformly distributed inside the positive active material. In addition, it can be seen that the Zr, Al, and B added during the sintering the positive active material are uniformly distributed inside as well as the main element.

It is observed that the $H_3BO_3$ raw material added during doping melts in the temperature rising region and uniformly diffuses into the positive active material.

To find out what concentration of the six elements in the positive active material primary particle, EDS analysis was performed. The primary part of the rod in the shell gradient zone is designated as zone 1, and the primary part of the bulk type in the core section is designated as zone 2. At this time, the beam size was 2-3 nm, and the acceleration voltage was 200 kV.

FIG. 3 is an image showing only the zone 1 of FIG. 1, and the result of measuring the point EDS in the lengthwise/horizontal rod length direction is shown in Table 1.

TABLE 1

| at % | 1 | 2 | 3 | 4 | 5 |
|---|---|---|---|---|---|
| B | 33.03 | 6 | 4.53 | — | 6.27 |
| Al | 0.03 | 0.46 | 0.12 | 0.32 | — |
| Mn | 1.21 | 5.76 | 4.03 | 2.3 | 2.85 |
| Co | 2.52 | 15.08 | 15.74 | 13.48 | 9.64 |
| Ni | 54 | 72.48 | 75.3 | 83.89 | 81.24 |
| Zr | 9.21 | 0.22 | 0.28 | 0.01 | — |

| at % | 6 | 7 | 8 | 9 | 10 |
|---|---|---|---|---|---|
| B | 3.32 | 5.42 | 13.28 | 3.56 | 4.56 |
| Al | 0.43 | 0.09 | 0.3 | 0.38 | 0.29 |
| Mn | 2.6 | 1.99 | 2.88 | 4.17 | 4.09 |
| Co | 11.44 | 11.76 | 7.71 | 9.79 | 11.25 |
| Ni | 82.04 | 80.58 | 75.78 | 82.1 | 78.87 |
| Zr | 0.17 | 0.16 | 0.05 | — | 0.94 |

Table 1 is a point EDS measurement result (zone 1) for each element of positive active material shell gradient in which B is co-doping.

As shown in Table 1, when B is co-doped with Zr and Al, it can be seen that boron is uniformly present inside the primary particle of the rod of the shell gradient. It was confirmed that an amount of less than 3.56 at % and more than 10 at % was detected. However, the detection of a large amount of B on the surface part is due to the coating of Boron on the surface and is independent of doping.

EDS analysis was performed to confirm that the boron is uniformly doped even for the bulk primary particles (zone 2) that do not have a concentration gradient in the core portion of the positive active material. Specifically, Points EDS analysis was performed for each position as shown in FIG. 4, and the results are shown in Table 2.

TABLE 2

| at % | 1 | 2 | 3 | 4 | 5 | 6 | 7 |
|---|---|---|---|---|---|---|---|
| B | 1.25 | 3.21 | 2.52 | 1.71 | 2.5 | — | 3.26 |
| Al | 0.21 | 0.22 | 0.53 | 0.34 | 0.32 | 0.33 | 0.47 |
| Mn | 2.1 | 1.12 | 2.02 | 1.92 | 1.83 | 2 | 1.94 |
| Co | 9.02 | 8.11 | 7.5 | 7.93 | 7.32 | 7.58 | 6.91 |
| Ni | 87.06 | 87.02 | 87.43 | 87.95 | 87.72 | 90.09 | 87.35 |
| Zr | 0.36 | 0.32 | — | 0.15 | 0.31 | — | 0.07 |

| at % | 8 | 9 | 10 | 11 | 12 | 13 | 14 |
|---|---|---|---|---|---|---|---|
| B | 2.15 | 0.28 | 1.57 | 5.17 | 1.87 | 4.95 | 2.45 |
| Al | 0.26 | 0.23 | 0.19 | — | 0.58 | 0.29 | 0.34 |
| Mn | 2.12 | 1.63 | 3.13 | 2.01 | 1.91 | 2.47 | 1.76 |
| Co | 7.84 | 8.79 | 9.43 | 9.51 | 8.26 | 7.53 | 7.89 |
| Ni | 87.1 | 88.79 | 85.31 | 82.58 | 87.13 | 84.5 | 87.56 |
| Zr | 0.53 | 0.28 | 0.37 | 0.73 | 0.25 | 0.26 | — |

| at % | 15 | 16 | 17 | 18 | 19 | 20 |
|---|---|---|---|---|---|---|
| B | 6.63 | 6.47 | 3.1 | 5.07 | 2.21 | 5.61 |
| Al | 0.29 | 0.44 | 0.25 | 0.21 | 0.12 | 0.38 |
| Mn | 1.83 | 1.66 | 1.82 | 1.8 | 1.35 | 2.55 |
| Co | 6.79 | 7.28 | 8 | 7.7 | 8.72 | 9.1 |
| Ni | 84.26 | 84.03 | 86.59 | 85.13 | 87.23 | 81.66 |
| Zr | 0.2 | 0.12 | 0.24 | 0.09 | 0.37 | 0.7 |

Table 2 is a point EDS measurement result (zone 2) for each element of the positive active material core bulk portion in which B is co-doping.

As shown in Table 2, when B is doped in zone 2 during sintering, it can be seen that B is measured from as little as 0.28 at % to as much as 6.63 at %. It can be seen that B is uniformly present in the primary particle of the core bulk part.

In this case, it can be seen that the distribution of B is slightly different compared to Zone 1. This phenomenon is a relative value for each element and is independent of the difference in the doping amount of the core portion and the shell portion.

FIG. 5 is a result of measuring particle strength before doping B and after doping 0.005 mol. Specifically, 20 large particles corresponding to 13.5 μm-13.9 μm size were selected, and measurement results for 15 particles with maximum and minimum values and noise removed using Shimadzu MCT-W500 Micro particle compression test sequence.

The particle strength is calculated by dividing the force applied to the particle by the cross-section of the positive active material particle, and is calculated by the following equation, and has the unit of MPa.

$$St = 2.8 P / \pi d^2$$

At this time, St is the particle strength (tensile strength, MPa), P is the applied pressure (test force, N) and d is the particle diameter (mm).

As shown in FIG. 5, the particles without B doping have an averaged a particle strength of 157.8 MPa, whereas the doping of B with 0.005 mol have a 182.8 MPa, resulted in an increase in particle strength of about 16%.

FIG. 6 is the result of measuring XRD before and after doping Boron. XRD was measured using PANalytical's X'pert3 powder (model name), and the scan rate was 0.328°/s.

As shown in FIG. 6, both before and after doping the boron, it can be seen that both samples were well developed 003 layer as the main peak at around 18.7°. It can be seen that splitting of 006/102 peak between 37.5° and 38.5° and 108/110 peak between 63.5° and 65.5° appears. This means that it has good crystalline ordering in the hexagonal layer. Therefore, it can be seen that it represents a typical hexagonal α-NaFeO$^2$ (space group R-3m) structure.

For crystallographic considerations by doping, Rietveld analysis was performed using high score plus Rietveld software, and the results are shown in Table 3. For Rietveld analysis, the XRD measurement range was fitted using a result measured at 10°-130°, and as the GOF (Goodness of Fit) value is calculated within 1.7, this simulation result can be said to be a reliable value.

2C before B doping, and 86.9% in 2C after B doping. It can be seen that there is no significant difference in the output characteristic from B doping.

However, the effect of B doping is clearly seen in the high temperature DCIR measurement result, which measures the voltage after 60 seconds when discharge current is applied after full charging 4.25 V at 45° C. high temperature.

FIG. 9 is a high temperature DCIR increase rate (45° C., SOC 100%) analysis result before and after boron doping.

As can be seen in FIG. 9, the B-doped sample showed a resistance increase rate of 84.6% compared to the initial value after 30 cycles. In the case of doping B, it showed a resistance increase rate of 66.7% so that it can be seen that the effect of improving the resistance increase rate of about 21%.

This is a very huge effect in actual rechargeable battery design and manufacturing. The high DCIR increasing rate according to the charge/discharge cycle reduces the design margin of the battery, but brings about a very good increase rate of resistance when doping B. This has the effect of enabling a variety of designs of medium and large rechargeable batteries.

TABLE 3

| | a(Å) | c(Å) | c/a | Crystalline size (nm) | I 003/I 104 | R_factor | GOF |
|---|---|---|---|---|---|---|---|
| Zr + Al doped | 2.871 | 14.192 | 4.943 | 87.5 | 1.10 | 0.543 | 1.701 |
| Zr + Al + B doped | 2.873 | 14.193 | 4.940 | 98.0 | 1.22 | 0.514 | 1.063 |

As shown in Table 3, there was little change in a-axis and c-axis before and after B doping. On the other hand, it can be seen that Boron is effective in increasing the crystal size, because the crystalline size increases about 10 nm, (98.0 nm) when B is doped.

The cation mixing degree of $Li^+$ and $Ni^{2+}$ was measured through the peak area ratio I003/I104 of I003 and I104. In addition, the R factor value to determine the hexagonal ordering degree was obtained through the peak area ratio of I006+I102/I101.

The sample before B doping showed I003/I104=1.10, while the B additional doped sample was found to slightly increase to I003/I104=1.22. It can be seen that the R factor value decreases from 0.543 before doping to 0.514 after doping.

Resultantly after the doped B, cation mixing was reduced, and the hexagonal structure was well grown.

The charge and discharge a curved line before and after doping B is shown in FIG. 7. Before doping B, the charging capacity was 236.3 mAh/g, the discharge capacity was 211.7 mAh/g, and the efficiency was 89.6%. On the other hand, after doping B, the charging capacity was 235.4 mAh/g, the discharge capacity was 213.5 mAh/g, and the efficiency was 90.7%. It can be seen that it is slightly advantageous in terms of the initial discharge capacity when doping B, but there is no significant difference in the charge and discharge profile.

FIG. 8 is a graph showing the output characteristics of each C-rate before and after B doping. It showed 86.7% in

TABLE 4

| Amount of B (based on B) | Particle Strength (MPa) | Initial discharge capacity (mAh/g) @0.2 C) | retention (%) (30 cycle @45° C.) | High Temp. DCIR Increasing rate (%) (30 cycle @45° C.) |
|---|---|---|---|---|
| 0.001 mol | 164.5 | 211.9 | 94.5 | 80.2 |
| 0.003 mol | 173.7 | 213.3 | 95.3 | 70.3 |
| 0.005 mol | 182.8 | 213.5 | 95.5 | 66.7 |
| 0.01 mol | 185.5 | 208.7 | 94.2 | 90.2 |
| 0.015 mol | 185.2 | 202.3 | 92.5 | 130.3 |

*Comparison of particle strength and coin cell performance as the amount of boron doping increases (Zr and Al are the same)

Table 4 shows the results of increasing particle strength and initial discharge capacity, high temperature charging and discharge cycle-life and DCIR increase rate while increasing the amount of boron doping in Zr Al doping. As B reaches 0.005 mol, it can be seen that the particle strength, initial capacity, charge and discharge capacity retention rate, and high temperature DCIR value are the most optimal.

In the case of particularly particle strength, the slope increased linearly with increasing B doping amount. At 0.01 mol, it was found that 0.005 mol was the maximum in terms of particle strength, as there was little increase in particle strength even when the concentration increased. In addition, in the case of 0.01 mol, the particle strength increased slightly, but the initial capacity, cycle capacity retention rate and the high temperature DCIR increase rate were rather worse. The optimal doping value of B can be confirmed to be 0.003 mol-0.005 mol.

TABLE 5

| Amount of Al | Particle strength (MPa) | Initial discharge Capacity (mAh/g @0.2 C) | Retention (%) (30 cycle @45° C.) | High Temp. DCIR increasing rate (%) (30 cycle @45° C.) |
|---|---|---|---|---|
| 0.0001 mol | 178.8 | 214.1 | 92.1 | 92.3 |
| 0.0002 mol | 180.3 | 214.0 | 94.5 | 71.5 |
| 0.0005 mol | 182.8 | 213.5 | 95.5 | 66.7 |
| 0.001 mol | 181.7 | 213.2 | 95.4 | 67.2 |
| 0.005 mol | 180.2 | 212.2 | 95.3 | 70.2 |
| 0.01 mol | 180.1 | 211.0 | 94.7 | 73.2 |
| 0.015 mol | 181.3 | 207.3 | 94.5 | 82.3 |

The Table 5 is a comparison result of coin cell performance according to the amount of Al doping. (Zr 0.036 mol, B 0.005 mol is the same)

When Al was doped 0.0001 mol compared to the positive active material standard, the particle strength was 178.8 MPa due to the effect that B contained 0.005 mol. The initial discharge capacity is also 214.1 mAh/g, which is a high value. However, the 30 cycle retention and high temperature DCIR increase rate were 92.1% and 92.3%, respectively, indicating poor results.

Simultaneously, if the amount of Al doping is greatly increased, the particle strength does not change significantly due to the B effect. The retention rate and the high temperature DCIR increase rate by Al doping effect also show good results. However, it can be seen that the initial discharge capacity is greatly reduced due to the Al effect of not participating in capacity expression.

From the result, it can be seen that the doping range in which the Al effect can be seen is 0.0002 mol to 0.01 mol.

TABLE 6

| Amount of Zr | Particle strength (MPa) | Initial discharge capacity (mAh/g @0.2 C) | Retention (%) (30 cycle @45° C.) | High Temp. DCIR increasing rate (%) (30 cycle @45° C.) |
|---|---|---|---|---|
| 0.001 mol | 180.3 | 215.2 | 92.3 | 98.2 |
| 0.0015 mol | 181.2 | 214.4 | 95.3 | 81.2 |
| 0.0036 mol | 182.8 | 213.5 | 95.5 | 66.7 |
| 0.005 mol | 179.2 | 212.1 | 95.0 | 73.2 |
| 0.007 mol | 175.2 | 205.5 | 94.3 | 80.3 |

The Table 6 is a comparison result of coin cell performance according to the amount of Zr doping. (Al 0.0005 mol, B 0.005 mol same)

When Zr is doped by 0.001 mol compared to the positive active material standard, the particle strength is 180.3 MPa by the effect of containing 0.005 mol of B. The initial discharge capacity is also 215.2 mAh/g, which is a high value. However, the 30 cycle retention rate and the high temperature DCIR increase rate were 92.3% and 98.2%, respectively, indicating poor results.

Simultaneously, when the Zr doping amount is increased to 0.007 mol, the capacity retention rate and the high temperature DCIR increase rate show relatively good results. However, it can be seen that the particle strength decreases to 175.2 MPa, and the initial capacity is particularly reduced to 205.5 mAh/g.

From the result, it can be seen that the doping range in which the Zr effect can be seen is 0.0015 mol to 0.005 mol.

The present invention is not limited to the embodiments and/or exemplary embodiments, but may be manufactured in various different forms, and those having ordinary knowledge in the technical field to which the present invention belongs may have technical ideas or essential features of the present invention. It will be understood that it may be implemented in other specific forms without changing the. Therefore, the embodiments and/or exemplary embodiments described above are illustrative in all aspects and should be understood as non-limiting.

The invention claimed is:

1. A positive active material for lithium secondary battery, wherein, the positive active material includes a layered lithium metal compound comprising nickel, cobalt, and manganese, and aluminum, zirconium, and boron are doped, wherein the lithium metal compound is represented by Chemical Formula 1 below:

$$Li_aNi_xCo_yMn_z(M)_{1-(x+y+z)}O_b$$

in which a $0.8 \leq a \leq 1.3$, $1.8 \leq b \leq 2.2$, $0.8 \leq x \leq 0.92$, $0 < y \leq 0.15$, $0 < z \leq 0.1$, and $0 < x+y+z < 1$; and the doping element M comprises Al, Zr, and B, wherein with respect to 1 mole of the entire metal containing Ni, Co, Mn, and M, a doping ratio of Al among the doping elements M is 0.0002 to 0.01 mol, a doping ratio of Zr among the doping elements M is 0.0015 to 0.005 mol, and a doping ratio of B among the doping elements M is 0.001 to 0.01 mol.

2. The positive active material of claim 1, wherein:
the positive active material comprises a core portion and a shell portion of the core portion surface,
the core portion and the shell portion are made of a composition containing Ni, Co, Mn, and M elements in the Chemical Formula 1.

3. The positive active material of claim 1, wherein:
the core portion is 70 to 80% for 100% of the entire positive active material diameter.

4. The positive active material of claim 2, wherein:
the content of nickel in the core is higher than that of nickel in the shell.

5. The positive active material of claim 2, wherein:
a distribution of nickel in the core is uniform.

6. The positive active material of claim 5, wherein:
a distribution of nickel content in the shell has a concentration gradient that decreases as it approaches the active material surface.

7. The positive active material of claim 1, wherein:
the positive active material has a crystal size (Crystalline size) of 90 nm or more.

8. The positive active material of claim 1, wherein:
the positive active material has an I003/I104 value of 1.2 or higher.

9. The positive active material of claim 1, wherein:
a R factor of the positive active material is 0.52 or less.

10. The positive active material of claim 2, wherein:
the positive active material further comprises a coating layer positioned on the surface of the shell portion.

11. The positive active material of claim 10, wherein:
the coating layer comprises boron, boron oxide, lithium boron oxide or combination thereof.

12. The positive active material of claim 1, wherein:
the positive active material is a bimodal mixed with large particle and small particle.

13. The positive active material of claim 12, wherein:
a D50 of the large particle is 13 to 17 μm.

14. The positive active material of claim 12, wherein:
a D50 of the small particle is 4 to 7 μm.

15. A method of manufacturing a positive active material for lithium the positive active material of claim 1, comprising:
- preparing precursor particles comprising nickel, cobalt, and manganese;
- obtaining lithium metal oxide by mixing and sintering the precursor particles, lithium raw material, and doping raw material;
- forming a coating layer by mixing and heating a coating raw material on the lithium metal oxide;
- wherein, the doped raw material comprises Al raw material, Zr raw material, and B raw material.

16. The method of claim 15, wherein:
- in the step of obtaining lithium metal oxide by mixing and sintering the precursor particles, lithium raw material, and doping raw material, a sintering condition continues to primary and secondary temperatures while inflowing oxygen, and
- the primary temperature is 450 to 550° C., and the secondary temperature is 700 to 750° C.

\* \* \* \* \*